Patented July 11, 1950

2,515,143

UNITED STATES PATENT OFFICE 2,515,143

PROCESS FOR PREPARING MONOMETHYLOL DICYANDIAMIDE

John Studeny, Stamford, Conn., assignor to American Cyanamid Company, New York, N. Y., a corporation of Maine No Drawing. Application May 5, 1948, Serial No. 25,304

2 Claims. (Cl. 260—551)

This invention relates to a process for the preparation of monomethylol dicyandiamide.

Monomethylol dicyandiamide was prepared in 1908 by F. Pohl, who reported his work in J. fur prakt. chem. (2), vol. 77, at pages 533–48. According to the method described, dicyandiamide was dissolved in hot water and equimolar proportions of the dicyandiamide so dissolved and of formaldehyde as a 40% aqueous solution were mixed together. Pohl found that upon heating, monomethylol dicyandiamide decomposed and, therefore, the mixture of dicyandiamide and formaldehyde was merely allowed to stand in a sulfuric acid desiccator. A 65% yield of desired monomethylol dicyandiamide was obtained by this long and tedious method.

More recently addition products of dicyandiamide and formaldehyde have been prepared by heating a mixture of the two ingredients under neutral or alkaline conditions. Since commercial formalin which is commonly used has a pH of about 3.2, introduction of a base to the reaction mixture has been necessary, see United States Patent No. 2,427,512.

It is an object of the present invention to provide a new process for the preparation of monomethylol dicyandiamide.

Another object of the present invention is to provide a simple process of preparing monomethylol dicyandiamide of high purity in a high yield.

Still another object of the present invention is the provision of a practicable and commercial process for the preparation of monomethylol dicyandiamide.

A further object of the present invention is the preparation of monomethylol dicyandiamide as a dry, non-hygroscopic white powder with desirable properties.

The above and other objects are attained by heating an acidic mixture consisting of substantially equimolar proportions of dicyandiamide and formalin until a clear solution forms, and then immediately cooling the solution.

The invention will be described in greater detail in conjunction with the following specific examples in which proportions are given in parts by weight unless otherwise indicated. It should be understood that it is not intended to limit the scope of the invention to the details therein set forth.

Example 1

840 parts of dicyandiamide (10 mols.) are added to 808.5 parts of 37% aqueous formaldehyde solution (10 mols. as formaldehyde), and the resulting slurry is slowly heated, with stirring, by steam. As the temperature increases, the slurry gradually becomes less viscous until finally when the temperature reaches about 75°–78° C., a clear solution or syrup is obtained. Before the temperature reaches about 80° C., heating is quickly discontinued and the clear solution or syrup is cooled with solid carbon dioxide while continuing the stirring. As the temperature drops, the clear syrup changes to a white cream which gradually becomes thicker until finally at about 34° C. it appears almost solid. The product is spread out on shallow trays and allowed to air-dry, the minor amount of water present being evaporated in less than 24 hours. 1110 parts of dry product (97.4% yield) having a melting point of about 118° C. and being soluble in water to the extent of 21.5–28 parts per 100 parts of water at 25° C., are obtained.

The results of analysis of the non-hygroscopic stable product are as follows:

|  | Calc. for $C_3H_6N_4O$ | Found |
|---|---|---|
| Per cent nitrogen | 49.10 | 49.33 |
| Per cent carbon | 31.57 | 32.62 |
| Per cent hydrogen | 5.30 | 5.74 |
| Per cent formaldehyde | 26.31 | 24.30 |

Example 2

The procedure of Example 1 is repeated using 168 parts (2 mols.) of dicyandiamide and 162 parts (2 mols.) of 37% aqueous formaldehyde solution. 212 parts of a product melting at 115°–118° C. are obtained, this quantity representing a yield of 93%. The product contains 48.26% nitrogen as compared with the calculated nitrogen content of $C_3H_6N_4O$ of 49.10%.

Example 3

103.5 parts (1.2 mols.) of commercial dicyandiamide and 99.8 parts (1.2 mols.) of commercial formalin (37% formaldehyde by weight) are charged into a jacketed kettle and means for agitation is inserted. With low speed stirring of the slurry of dicyandiamide and formalin, steam is applied through the jacket and the temperature of the slurry is slowly raised. The initial pH is about 4. After approximately 25 minutes of heating, a clear solution or syrup is obtained. At this point the temperature is about 74° C. and the reaction mixture is slightly alkaline. The steam is shut off, cooling water is applied through the jacket, and stirring is continued. As the temperature drops to about 41° C., the syrup turns milky and at about 38° C. a thick creamy product is obtained. This wet product is poured out on shallow stainless steel trays and allowed to dry in a current of air at room temperature. 140 parts, representing almost the theoretical yield of monomethylol dicyandiamide, of a dry white powder having a melting point of about 118° C. and good solubility in water are obtained. The pH of a 10% aqueous solution is 8.2 at 32° C. Chemical analysis indicates the total nitrogen content of the product as 49.05% (theory 49.1%), the total formaldehyde content as 24.7% (theory 26.31%), and the moisture content as 0.06%.

The acidity of the reaction mixture of dicyandiamide and formaldehyde is due to the inherent acidity of the aqueous formaldehyde solution used. It will normally run from a pH of about 3 to a pH of about 5.

The dicyandiamide and formaldehyde are heated together until a clear solution or syrup is formed; this will normally occur at a temperature between 70° and 80° C. The reaction mixture should not be permitted to reach 80° C. As soon as the clear solution or syrup is obtained, or just before the temperature reaches 80° C., the reaction mixture is immediately cooled. At 30° to 40° C. a solidified product is formed. This solidified product may be dried in any desired manner, avoiding the use of temperatures above about 60° C. I prefer a simple air drying process at room temperature, i. e., 20°–30° C., but the invention is not limited to this preferred embodiment.

It is an advantage of the process of the present invention that there is no excess water in the reaction mixture, and consequently the necessity for removing it from the desired product is avoided.

It is another advantage of the process of the present invention that it is simple and commercially practicable.

Still another advantage of the process of the present invention resides in the high yield and purity of the product obtained.

Still another advantage of the process of the present invention is the fact that the product obtained thereby is a dry, non-hygroscopic white powder with desirable properties as to solubility in water, stability on storage, etc.

The present invention covers a surprising and unexpected development in the preparation of monomethylol dicyandiamide. My process proceeds directly contrary to the teachings of the prior art and yet substantially theoretical yields of exceptionally pure monomethylol dicyandiamide are possible. In the preparation of amino resins, heating on the acid side is normally avoided if polymerization is not desired. In the present case, I have found it possible to heat an amino resin-forming reaction mixture on the acid side and to so control the heating operation as to forestall any resin formation and obtain a pure monomeric product. Herein lies an additional important advantage of my process.

Monomethylol dicyandiamide is generally useful as a chemical intermediate, and more specifically, has applications in the manufacture of paper, textiles, cellulosic films, filaments, plastics, etc. It is useful as a viscosity modifying agent in starch compositions and in other film-forming products.

I claim:

1. A process which comprises heating a mixture consisting of substantially equimolar proportions of dicyandiamide and formalin until a clear solution is formed, quickly cooling said clear solution until a solidified product is obtained, and drying the solidified product to remove the final traces of water therefrom.

2. A process which comprises heating a mixture consisting of substantially equimolar proportions of dicyandiamide and formalin until a clear solution is formed, immediately cooling the clear solution obtained to 30° to 40° C., and air drying the solidified product which results to remove the final traces of water therefrom.

JOHN STUDENY.

REFERENCES CITED

The following references are of record in the file of this patent:

UNITED STATES PATENTS

| Number | Name | Date |
|---|---|---|
| 1,780,636 | Stine | Nov. 4, 1930 |
| 2,427,512 | Scott | Sept. 16, 1947 |

FOREIGN PATENTS

| Number | Country | Date |
|---|---|---|
| 665,210 | France | May 6, 1929 |

OTHER REFERENCES

Pohls, "J. Prak. Chem.," vol. 77 (1908), pages 537 and 538.

"Chemical Abstracts," vol. 19 (1925), page 562.